(12) United States Patent
Grimberg et al.

(10) Patent No.: US 7,880,098 B2
(45) Date of Patent: Feb. 1, 2011

(54) CONNECTING BOX OF A SOLAR PANEL WITH A COOLING STRUCTURE

(75) Inventors: Thomas Grimberg, Winterthur (CH); Hanns Watrinet, Eschenbach (CH); Max Göldi, Pfäffikon (CH); Sylvère Leu, Schönenberg (CH)

(73) Assignee: Hubert + Suhner AG, Herisau (CH)

( * ) Notice: Subject to any disclaimer, the term of this patent is extended or adjusted under 35 U.S.C. 154(b) by 0 days.

(21) Appl. No.: 12/450,786

(22) PCT Filed: Dec. 3, 2007

(86) PCT No.: PCT/CH2007/000607

§ 371 (c)(1),
(2), (4) Date: Dec. 15, 2009

(87) PCT Pub. No.: WO2008/124951

PCT Pub. Date: Oct. 23, 2008

(65) Prior Publication Data

US 2010/0170715 A1    Jul. 8, 2010

(30) Foreign Application Priority Data

Apr. 13, 2007   (CH) .................................. 613/07

(51) Int. Cl.
*H05K 7/20* (2006.01)
(52) U.S. Cl. ...................... 174/547; 439/76.1; 136/251
(58) Field of Classification Search ............... 439/76.1, 439/485; 174/50.51, 520, 547; 361/690, 361/694; 136/251
See application file for complete search history.

(56) References Cited

U.S. PATENT DOCUMENTS

| | | | |
|---|---|---|---|
| 6,437,236 B2 | 8/2002 | Watanabe et al. | |
| 6,524,136 B2* | 2/2003 | Kawaguchi et al. | .... 439/620.26 |
| 6,582,249 B1 | 6/2003 | Boeck et al. | |
| 7,316,576 B2* | 1/2008 | Saito et al. | .................. 439/76.2 |
| 7,632,109 B2* | 12/2009 | Boensch et al. | ............ 439/76.1 |
| 2008/0236886 A1 | 10/2008 | Gerull et al. | |
| 2009/0272574 A1 | 11/2009 | Richter et al. | |
| 2010/0018572 A1 | 1/2010 | Grimberg et al. | |

FOREIGN PATENT DOCUMENTS

| | | |
|---|---|---|
| DE | 10334935 | 12/2004 |
| DE | 202005007592 | 7/2005 |
| DE | 2002005018884 | 3/2006 |
| DE | 1002005044939 | 5/2006 |
| EP | 0793278 | 9/1997 |
| EP | 1501133 | 1/2005 |
| EP | 1605554 | 12/2005 |
| EP | 0999601 | 12/2006 |
| JP | 20022359389 | 12/2002 |
| JP | 2005033229 | 2/2005 |
| JP | 2006073990 | 3/2006 |
| WO | WO 9312636 | 6/1993 |
| WO | WO 2006074561 | 7/2006 |

\* cited by examiner

*Primary Examiner*—Hae Moon Hyeon
(74) *Attorney, Agent, or Firm*—Pauley Petersen & Erickson

(57) ABSTRACT

The invention relates to a receptacle (1) particularly suitable for wiring one or more solar cells (81). The receptacle (1) comprises a housing (10) and a connecting shaft (60) that can be separately closed by a cover (63). The receptacle (1) is raised from the back side of the solar panel (80).

12 Claims, 3 Drawing Sheets

CONNECTING BOX OF A SOLAR PANEL WITH A COOLING STRUCTURE

CROSS-REFERENCE TO RELATED APPLICATIONS

This application is a 371 International Application PCT/CH2007/000607 filed on 3 Dec. 2007 which claims priority to Swiss Application 00613/07 filed on 13 Apr. 2007.

BACKGROUND OF THE INVENTION

1. Field of the Invention

The present invention relates to the field of connection technology, and relates in particular to a connecting box for connection of wiring to an appliance, in particular for connection of wiring to a photovoltaic module (photovoltaic collector, solar panel, solar cell).

2. Description of Related Art

Photovoltaic solar installations are generally of modular design and comprise a multiplicity of solar cells which are connected via external wiring. In order to achieve a higher voltage, the individual solar cells are connected at least in groups in series, by the positive pole of a first solar cell being connected to the negative pole of a further solar cell. One problem that arises in this case is that, when a solar cell is partially covered, for example, as a result of a shadow thrown by surrounding objects or by clouds, this solar cell becomes passive and contributes only slightly, if at all, to the electricity production. In consequence, when connected in series, the current from the adjacent solar cell flows through the covered solar cell, which can thus be damaged or, at least, its life may be reduced. For this reason, it is known for solar cells to be temporarily bridged by means of an electronic circuit, which generally has diodes as protective elements, and thus to be decoupled from the electricity production during the disturbance. These electronic circuits are frequently accommodated in connecting boxes which are at the same time used for connection of the wiring.

EP999601 from Sumitomo Wiring Systems Ltd. discloses a connecting box for solar cells having a housing with a lower and an upper cover, which can be connected to one another via plug connections. The upper cover has connections for external electrical wiring, as well as electrical plug contacts which are arranged such that, when the housing is in the closed position, they result in an electrical connection to corresponding electrical contacts on the lower cover. Diodes are arranged in the upper cover, and are used for protection of the solar cell. In order to make the arrangement weather-resistant, the diodes are encapsulated in a filler material, for example silicone. One particular disadvantage of these arrangements is that they are unsuitable for present-day high-power solar cells, since they have an inadequate cooling. A further disadvantage is that the proposed encapsulation in silicone unnecessarily increases the material consumption and the weight, and is time-consuming.

U.S. Pat. No. 6,582,249 from Tyco Electronics AMP GmbH discloses a connecting box for solar modules having a housing composed of plastic and having a cover which is connected to a hinge strip. The housing lower part has an opening for connections of a solar panel, and connections for external electrical wiring. Electrical components, for example diodes, are fitted between the connections in the housing lower part. The electrical components may be protected against direct contact by a protective cover which is fitted to the side inner wall of the housing such that it can pivot. The components are preferably encapsulated with a filler material through an opening in the protective cover, after the protective cover has been fixed in the correct position in the housing.

EP1605554 from Mantenimiento Instalaciones Malaga S L discloses a connecting box for solar cells having a housing lower part and a cover with a detachable plug connection. The housing has a first opening for connections of a solar cell, and a second opening for connections of external electrical wiring. A printed circuit board can be mounted in the housing by means of a screw.

German Utility Model DE202005018884U1, from Multi-Holding AG, discloses a connecting box for a solar panel. The connecting box has a housing lower part and a cover which is connected to the housing lower part such that it can pivot. The housing lower part has openings for connections of a solar panel, and has external electrical wiring. Contact elements for attachment of electrical components, in particular diodes, are provided in the interior of the housing. The contact elements are designed such that they are intended to absorb and dissipate the heat which is created by the diodes.

EP1501133 from Tyco Electronic AMP GmbH discloses a connecting box for a solar panel. The connecting box has a housing lower part and a cover which is connected to the housing lower part via a hinge such that it can pivot. In the area of the bottom, the housing lower part has an opening for connections of a solar panel and, in a side wall, it has openings for external electrical wiring. Busbars and contact elements are arranged in the interior of the housing. One embodiment has a printed circuit board with diodes, which are held firmly by holding elements of the housing.

JP20022359389 from Kitani Denki KK, discloses a connecting box for solar cells having a housing with a housing lower part and a removable cover. Openings in the area of the bottom of the housing lower part are used for connection to a solar panel. Openings in a side wall are used for connection of electrical wiring. Diodes which are arranged such that they can be replaced are used as protective elements.

DE102005044939 from Spelsberg Guenther GmbH Co KG discloses a connecting box for solar cells. The connecting box has a protective device, for example in the form of a bypass diode. The printed circuit board is connected to a cooling element, which is passed out of the housing and is connected to the frame of the solar panel, in order to dissipate heat.

One disadvantage of the connecting boxes which are known from the prior art is the inadequate cooling of the electronic components, and the thermal loading of the solar cells which this results in.

One object of the invention is therefore to disclose a connecting box which does not have the disadvantages to which the prior art is subject.

This object is achieved by the invention as defined in the patent claims.

SUMMARY OF THE INVENTION

A connecting box according to the invention generally has an integral or multi-part housing, which surrounds a printed circuit board with electrical/electronic components. Dependent on the embodiment, the housing is formed from a plurality of parts and has a housing lower part and a housing upper part. Alternatively, the housing can be formed by insert molding of the internal parts.

The connecting box is generally designed such that it can be mounted by means of a mounting cap on a base surface, for example the rear face of a solar panel. The mounting cap may in this case be in the form of a separate part, to which a housing part is operatively connected. In order to achieve better force distribution and/or in order to influence convectional cooling, the mounting cap may be designed in a segmented form.

In general, the contact lugs or the contact wires for example of a solar cell are guided into a connecting slot in the connecting box, where they are operatively connected to the printed circuit board via connections which are provided for this purpose. Depending on the embodiment, this connecting slot may be integrally formed peripherally at the edge of the connecting box, or else may be placed within the connecting box. In general, the connecting slot is open at the top and at the bottom.

In one embodiment, external connecting cables are passed into the housing of the connecting box, where they are operatively connected to the printed circuit board (board or stamped grid). If required, the connecting cables have standardized plug connections, thus allowing simple connection externally. Holders for the plug connections and the cables can be provided on the housing of the connecting box, in which the plug connections can be suspended in a defined position for transportation and automatic testing, for example during fitting.

The connecting slot may be closed by a cover, if required. The cover may be designed such that it actively prevents an encapsulation compound that has been introduced but is not yet cured from running out. For example, this means that it is possible to position a completely prefabricated solar panel independently of the position, immediately after the encapsulation of the connecting slot, without the encapsulation compound flowing out again. This shortens the time required for fitting. The cover is advantageously in the form of a displacer, thus reducing the amount of encapsulation compound required for the encapsulation process. In order to monitor the filling level, the cover may, furthermore, be produced from a transparent material.

If required, the cover has one or more openings for introduction of an encapsulation compound and for venting. In one embodiment, the cover has two openings, with one of the two being used for filling, and the other for venting. Since, for example, these are arranged diagonally opposite one another and close to the edge of the encapsulation slot, one of the openings is always lower than the other, thus simplifying the filling process. For example, the opening which is located lower can be filled, as a result of which the air that is enclosed can escape from the connecting slot at the opening which is located higher. Another embodiment has a central opening for filling and one or more vent holes at the edge. Other arrangements are possible. If required, the filling openings have so-called connecting stubs which allow connection of a filling apparatus.

By way of example, the cover of the connecting slot may be closed by snapping in, screwing, adhesive bonding or ultrasound welding, or a combination thereof. If the connecting slot is intended to be encapsulated, the cover is preferably designed such that the required encapsulation compound is minimized. For this purpose, the cover has a displacer, for example on its inside, projecting into the connecting slot. Alternatively, a separate part, a displacer, can be introduced into the connecting slot before closure with the cover, without this displacer being integrated in the cover or connected to it. In one embodiment, the cover presses in the intended manner against the connections and against the contact lugs/contact wires, thus improving the electrical contact between the contact lugs/contact wires and the connections. The described type of cover may also be used to close connecting slots of other connecting boxes, and is therefore not restricted to use with the variant disclosed here.

One embodiment of the connecting box is designed such that the rear face of the connecting box does not rest flat on the solar cell, but is held at a certain distance from it by means of the mounting cap. Such raising from the base area has the advantage that the thermal load between the electronic components of the connecting box and the solar panel is reduced. Furthermore, the connecting box may have air guide plates/cooling ribs, which influence the air circulation on the rear face of the box and thus improve the cooling, or prevent heat accumulations. The air guide plates may be produced from the same material as the housing of the connecting box. In order to improve the mechanical robustness and/or to positively influence the air circulation, the air guide plates may be curved, and/or may be used for support on a solar panel in the fitted state. The connecting slot may itself be in the form of a mounting cap. If required, further supports can be provided. The distance between the base area and the rear wall of the connecting box is generally 2-30 mm, although other distances are possible, depending on the embodiment.

In one embodiment, the mounting cap is segmented such that it projects from the connecting box only on two mutually opposite sides thereof, thus assisting free air circulation. Feet which are parts of the mounting cap as well as the lower edge of the connecting slot are operatively connected to the surface of a solar panel, preferably by adhesive bonding. Air channels can be formed by webs on the housing lower part, and assist convectional cooling. The air guide plates are used to pass the air flow around the connecting slot, thus reducing the risk of heat accumulations. Depending on the position of the solar panel and the position of the connecting box on the solar panel, connecting boxes are used which have the webs aligned approximately parallel to the X axis or Y axis, as a result of which the air flow always passes upwards from the bottom.

Alternatively, the webs may also run in any other direction.

Single-layer or multiple-layer solutions may be provided as a printed circuit board for connection of the electrical/electronic components. In addition to etched printed circuit boards with a copper layer applied on an electrically insulating mount material, it is possible to use a grid produced by stamping from a metal sheet (stamped grid). In one corresponding embodiment, the housing has correspondingly designed holding means, for example in the form of snap-action or clamping connections, for holding the stamped grid. Furthermore, stamped grids have the advantage that they can easily be insert molded together with the electronic components arranged on them, in an injection mold. This makes it possible to ensure that the interior is hermetically sealed. A further advantage is that the heat that is created is dissipated efficiently outward through stamped grids or printed circuit boards which rest on the housing.

The sheet-metal thickness of a stamped grid is 0.4 mm, depending on the embodiment. Because it is solid, the board is also used as a cooling plate for the electrical/electronic components. Electrically and thermally sufficiently conductive materials are used as the material. Inter alia, for example, CuSn0.15, CuFe2P or Cu-ETP may be used, in addition to copper, steel or aluminum alloys.

The housing parts of the connecting box are generally designed such that the board rests closely on them, in order to dissipate the heat from the electrical/electronic components via the printed circuit boards and the housing to the exterior. Since, in one embodiment, the electrical/electronic components, for example diodes, as well as the external cables must be connected at least on one side of the board, corresponding cutouts are in each case provided in the housing. One advantage of a stamped grid is that the resultant heat can be dissipated well both downwards and upwards via a housing resting closely on it. In order to further optimize the thermal conductivity between the board and the housing, said cutouts as well as further air spaces, which may be present, are filled with a thermally conductive and electrically insulating compound (for example thermally conductive paste), before the housing is closed.

The housing parts are preferably produced by injection molding or diecasting, although other production methods are also feasible. In general, a sufficiently temperature-resistant material is used for this purpose, for example polyamide (PA), polyphenylether (PPO, PPE), polycarbonate (PC), polybutylene terephthalate (PBT) or polyethylene terephthalate (PET). These materials may be filled with fibers, for example 10% to 60% glass fibers. Other materials are possible, depending on the embodiment.

In order to protect the electronics in the connecting box against moisture and other environmental influences, the housing parts can be sealed from the outside by a circumferential seal. This seal may be in the form of a separate part or may be integrally formed on the housing by means of multi-component injection molding. It is also feasible to provide a simple circumferential groove in one housing part and a correspondingly projecting circumferential rib in the other housing part, which correspond to one another in the closed position. Alternatively or additionally, the groove can be filled with a sealing compound, for example silicone, before closure. In a further refinement, this groove can be deliberately made larger, such that the sealing compound can be introduced into the resultant cavity retrospectively, when the housing is closed. Corresponding openings and connecting stubs are provided.

In the situation in which a connecting box is intended to be attached using an adhesive which cures slowly, the time required for processing can be bridged by the use of a supplementary holding means. Good results are achieved by means of double-sided adhesive tape. Depending on the field of application, it is possible to also attach the connecting box exclusively by double-sided adhesive tape. Double-sided adhesive tape allows immediate fixing of the connecting box on a base surface, and this can have a positive influence both on the processing time and on automated processing. Further sealing means may be provided between the connecting box and a base surface.

One refinement of a connecting box having a housing and a connecting slot, which is used for connection of at least one electronic component, which is arranged on a printed circuit board in the interior of the housing, to electrical connections of a solar panel, with the housing having a projecting mounting cap which is used for attachment of the connecting box to a surface of the solar panel, is designed such that the rear wall of the housing, when in the fitted state, is at a distance from the solar panel such that this results in convectional cooling of the housing. In this case, the connecting slot can be fitted peripherally to the housing of the connecting box. In a further embodiment, the mounting cap is formed from a variety of parts and can surround the connecting slot. One specific embodiment has at least one adhesive surface for holding an adhesive and/or a double-sided adhesive tape on the mounting cap. A further embodiment of a connecting box has air guide plates which are arranged on the housing rear face. These air guide plates can be designed such that, in the assembled state, they are used to support the housing with respect to a solar panel. It is also possible for the housing to rest at least in places closely on the printed circuit board, as a result of which heat that is created is transported outwards through the housing. The printed circuit board may in this case be in the form of a traditional printed circuit board, a stamped grid or as simple wiring. In a further variant of the connecting box, the housing, which comprises a housing lower part and a housing upper part, closely surrounds the printed circuit board and the at least one electronic component. In particular, the housing may be formed integrally by insert molding of the printed circuit board and the at least one electronic component. In one preferred embodiment, the connecting slot is suitable for holding an encapsulation means.

BRIEF DESCRIPTION OF THE DRAWINGS

Embodiments of the invention will be explained in more detail with reference to the following figures, in which.

DETAILED DESCRIPTION OF THE INVENTION

Figure 1:
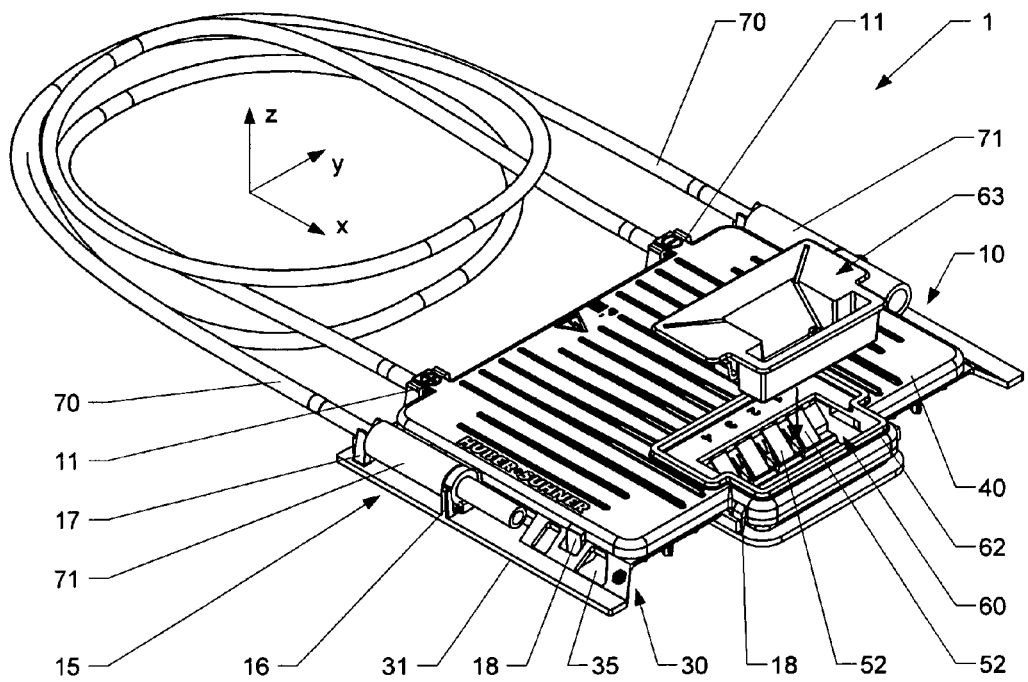
FIG. 1 shows a perspective illustration of a connecting box obliquely from in front and above.
Figure 2:
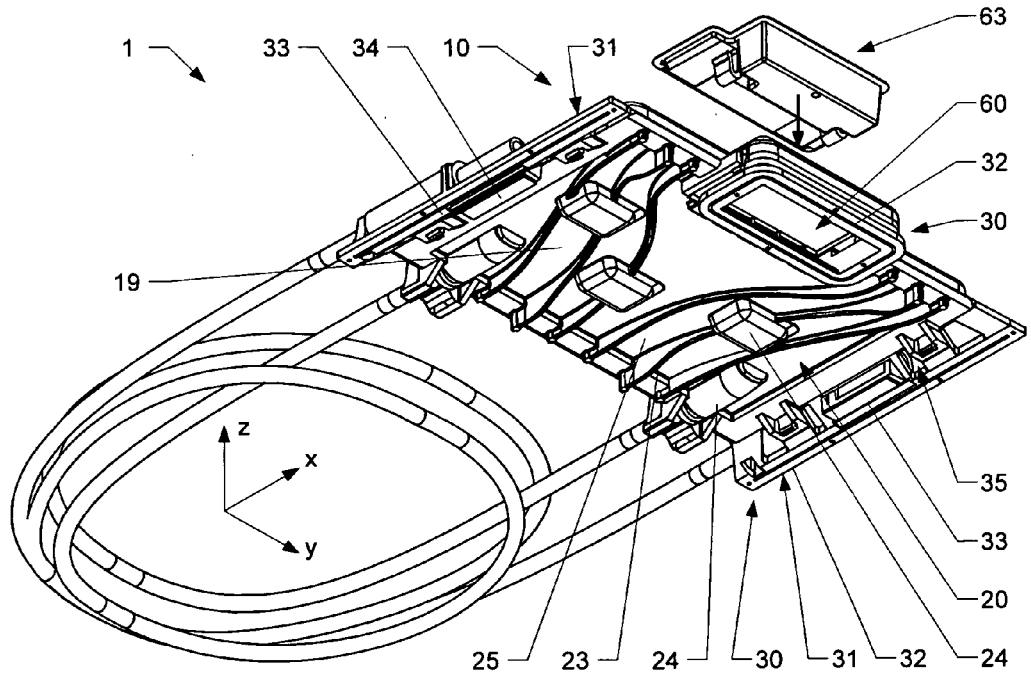
FIG. 2 shows a perspective illustration of the connecting box shown in FIG. 1, obliquely from the front and underneath.
Figure 3:
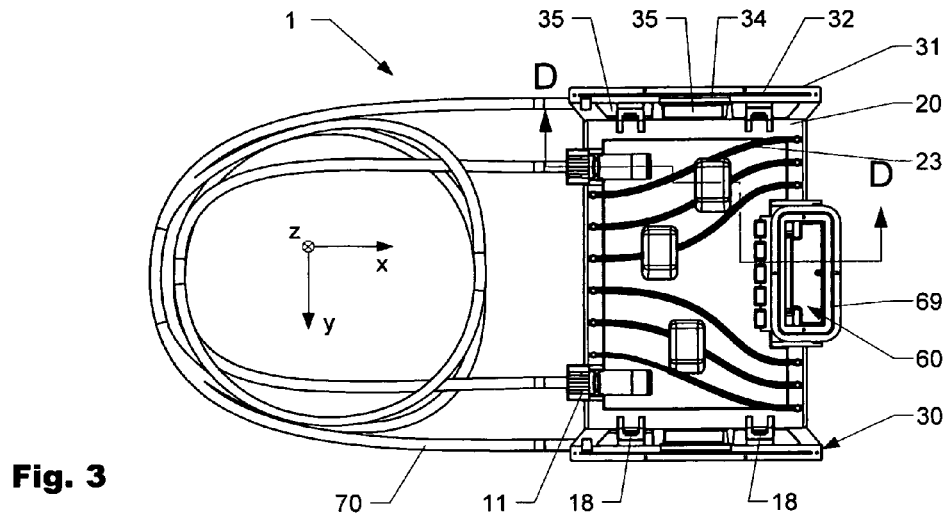
FIG. 3 shows a view from underneath of the connecting box shown in FIG. 1.
Figure 4:
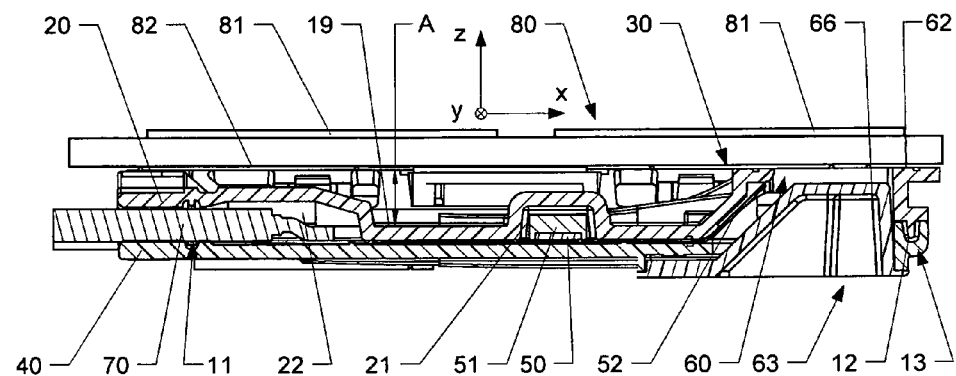
FIG. 4 shows a section illustration along the line DD in FIG. 3.
Figure 5:
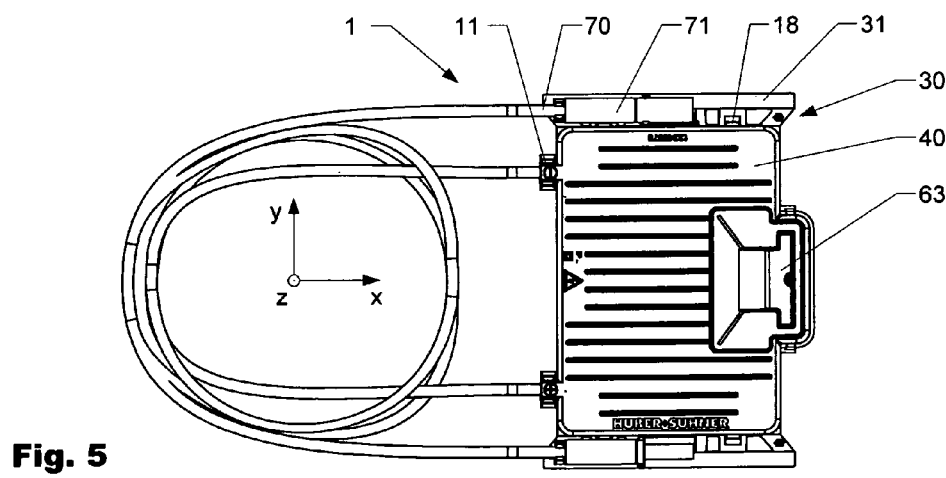
FIG. 5 shows a plan view of the connecting box shown in FIG. 1.
Figure 6:
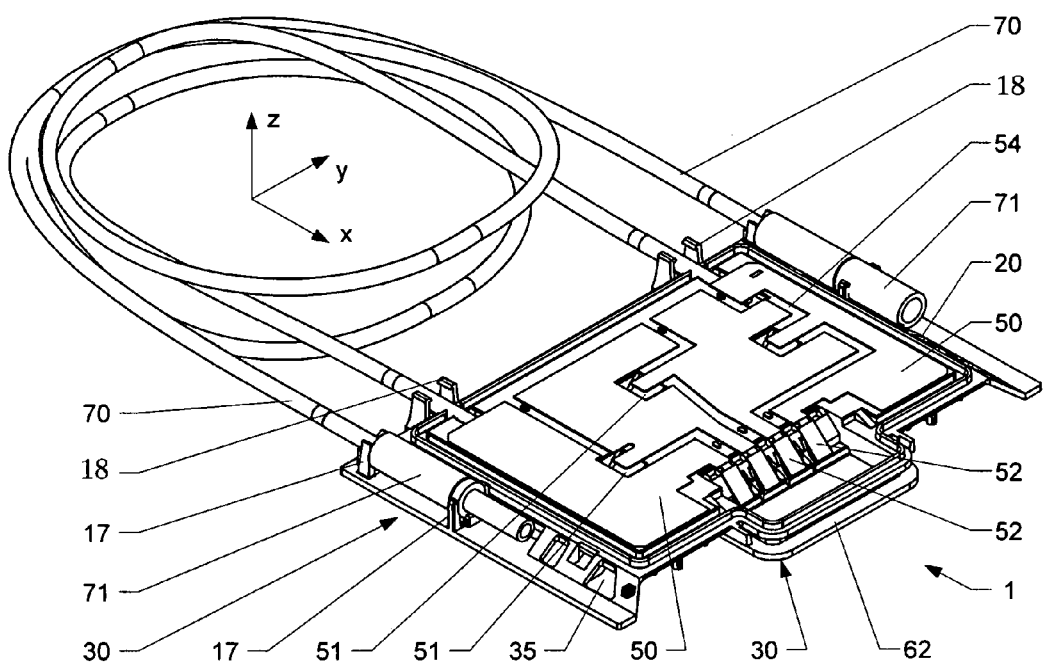
FIG. 6 shows a perspective illustration of the connecting box shown in FIG. 1, with the housing upper part removed, obliquely from the front and above.

FIG. 1 shows a perspective illustration of a connecting box 1 obliquely from the front and above, and FIG. 2 shows the same connecting box 1 obliquely from the front and underneath. FIG. 3 shows the connecting box 1 from underneath, FIG. 4 shows a section illustration (section line DD as shown in FIG. 3) from the side, FIG. 5 shows it from above, and FIG. 6 shows it in the open state, obliquely from above.

The figures show a housing 10, comprising a housing upper part 40 and a housing lower part 20. The two housing parts 20, 40 are in this case connected to one another, inter alia, by means of snap-action tabs 18, that can alternatively or additionally be adhesively bonded to one another, for example, if required. Feet 31 project at the side from the housing 10 and are part of a mounting cap 30 which is segmented here and projects downwards. The mounting cap 30 is used for the actual attachment of the housing 10 to a surface of a solar panel (neither is illustrated in any more detail). In the illustrated embodiment, the mounting cap 30 is an integral component of the housing 10, but may also be in the form of a separate part. The mounting cap 30 governs the distance A (cf. FIG. 4) which is required for convectional cooling on the housing lower face, between a rear wall 19 of the housing and the solar panel 80.

In the front area, the housing 10 has a connecting slot 60 with connections 52, which are used for connection of contact lugs or contact wires, for example of a solar panel (none of which is illustrated in any more detail here). The connecting slot 60 is open all the way through and can be closed separately from the rest of the housing 10. This allows the connecting box 1 to be fitted and closed independently of the assembly process. In consequence, the interior of the connecting box 1 is not subject to any damaging environmental influences. Depending on the embodiment, the connecting slot 60 is open at the top or side. Depending on the field of application, it is arranged in the center of the connecting box 1, or peripherally.

The connections 52 are operatively connected to a printed circuit board 50, for example in the form of a stamped grid 50 (cf. FIG. 6) or of a board, which is located in the interior of the housing 10. The connecting slot 60 is likewise a component of the mounting cap 30. The outer wall of the connecting slot 60, which essentially has an O-shaped cross section (XY plane) is formed by a circumferential frame 62, which opens at the lower end into a circumferential mounting surface 69 (adhesive surface). The mounting surface 69 is designed such that it is suitable for holding adhesive and/or double-sided adhesive tape, and can be used for attachment of the housing 10 to the solar panel and/or for sealing of the connecting slot 60 against external influences. Other refinements of a separately closeable connecting slot, for example arranged peripherally on the housing 10 and open at the side with an essentially U-shaped cross section, are possible.

Cable entries 11 can be seen in the area of the connecting box 1 located further backwards, through which connecting cables 70 are introduced into the housing 10. If the intention is only to connect electronic components to a solar panel, there is no need for external wiring. In the illustrated embodiment, the cable entries 11 are used at the same time as strain relief for the connecting cables 70, fixing them via a clamping apparatus. In the illustrated embodiment, the connecting cables 70 are terminated by plug connectors 71, thus allowing simple connection or disconnection, for example to or from an external load. The plug connectors 71 are each fixed by means of a holder 15, which is arranged at the side on the housing 10. In this case, the holder 15 comprises a plug bracket 16 and a cable bracket 17, and is arranged such that the plug connectors 71 are located in a position which is advantageous for automatic functional testing and for transport. A position arranged at the side on the housing 10 has been proven in practical use. However, it is clear to a person skilled in the art that the holder 15 can also be fitted at some other point, or that the plug connector 71 can be held firmly oriented in a different direction.

In FIG. 2, which shows the connecting box 1 obliquely from underneath, the housing lower part 20 with the connecting slot 60 and the mounting cap 30, as well as the feet 31 fitted thereto, can be seen. Bulges 24 for electronic components, for example diodes, and cables can be seen on the lower face of the housing lower part 20.

Air guide plates 23 are integrally formed on the housing lower part 20 and, in the illustrated embodiment, run approximately parallel to one another and to the feet 31 of the mounting cap 30. The air guide plates 23 extend approximately over the entire extent of the connecting box 1. The air guide plates 23 may vary in height with respect to one another or within their length, thus also allowing a flow transversely with respect to them. They may be designed at some points to be sufficiently high that, in addition to the feet 31 of the mounting cap 30, they allow the housing 10 to be supported on the solar panel. In addition to providing robustness and a supporting effect for the housing lower part 20, the air guide plates 23 also form air channels 25, thus making it possible to deliberately pass an air flow through them. In the illustrated embodiment, the air guide plates 23 pass the air flow through under the housing 10 and therefore have a positive effect on the cooling of the housing 10. The S-shaped configuration provides more robustness. Depending on the field of application, the air guide plates 23 may be entirely omitted or may be designed correspondingly differently, for example such that air can also circulate in the lateral direction.

In the illustrated embodiment, the mounting cap 30 has openings 35 at the side, which allow an additional air exchange under the housing lower part 20.

The mounting cap 30 is designed such that the entire connecting box 1 is raised off a base surface 82 of the solar panel 80. The feet 31 which project at the side from the mounting cap 30, and the lower edge of the connecting slot 60, are formed with adhesive surfaces 32 which are used to hold an adhesive and to which the connecting box 1 is adhesively bonded on the base surface 82 of the solar panel 80, for example the rear face of a solar cell. In addition to the adhesive surfaces 32, the feet 31 have second mounting surfaces 33 to which, for example, a double-sided adhesive tape 34 can be fitted. This double-sided adhesive tape 34 allows immediate fixing of the connecting box 1 on the base surface 82 before the adhesive between the adhesive surface 32 and the surface of the solar cell has cured.

FIG. 4 shows a section illustration along the line DD shown in FIG. 3. In this case, the connecting box 1 is mounted on the base surface 82, for example the rear face of a schematically illustrated solar panel 80 (the solar panel is not illustrated in FIG. 3). Starting from the rear face of the solar panel 80, contact lugs or the contact wires (not illustrated in any more detail) of the solar cell 81 are introduced into the connecting slot 60, and are connected there to the connections 52 of the board 50. In the illustrated embodiment, the contact lugs are soldered to the connections 52, although alternative forms of making contact, for example using terminals, are feasible. The connecting slot 60 is closed by a cover 63. The cover 63 has a central opening 66 for filling the connecting slot 60 with an encapsulation compound. Furthermore, the cover 63 is designed such that it projects into the connecting slot 60, thus reducing the amount of encapsulation compound required to fill the cavity. The encapsulation compound seals the connections 52 of the board 50 as well as the contact lugs or contact wires of the solar cell 81 with respect to environmental influences. The electrical connecting cable 70 is clamped in as strain relief by means of a cable clamp 11 between the housing lower part and the housing upper part.

Circumferentially at their edge, the two housing parts 20, 40 have a seal 12 which, in the illustrated case, is formed by a tongue and groove system 13. Alternatively, however, the seal 12 may also be provided by a conventional sealing ring, which is inserted into a groove, either on the housing upper part 40 or on the housing lower part 20, directly by a sealing compound introduced by means of two-component injection molding, or by a labyrinth seal. The board 50, with its electrical/electronic components 51 fitted on the lower face, rests flat on the two housing halves 20, 40, with diode and cable cutouts 21, 22 being provided in the housing lower part 20 for the electrical/electronic components 51 and the external connecting cables 70, which are arranged on the board, where contact is made with them. Alternatively, these cutouts 21, 22 may be formed in the housing upper part 40, and the corresponding components may be mounted on the upper face of the board 50. The board 50 or at least the connections 52 project out of the two closed housing parts 20, 40 into the connecting slot 60.

FIG. 6 shows a perspective illustration of the connecting box 1, with the housing part 40 as shown in FIG. 1 removed, obliquely from the front and above. The figure shows the printed circuit board 50 which has been placed on the housing lower part 20 and is manufactured by stamping from a solid metal sheet (stamped grid). The board 50 is designed to have as large an area as possible in order to dissipate the heat, which is produced in the electrical/electronic components 51, as efficiently as possible via the housing to the exterior. The board 50 is subdivided by insulating separating joints 54 into subareas which are connected to the connections 52. The subareas of the board 50 are connected to one another via the electrical/electronic components 51.

The feet 31 project at the side of the housing lower part 20 and, together with the connecting slot 60, form the mounting cap 30. A holder 15 for a plug connection 71 is arranged on each foot 31, and the plug connection 71 essentially comprises a cable bracket 70 and a plug bracket 16.

The invention claimed is:

1. A connecting box (1) for connection of at least one electronic component (51) to electrical connections of a solar panel (80), the connecting box comprising:
    a housing (10) containing the at least one electronic component (51) and a connecting slot (60) arranged on the housing;
    a projecting mounting cap (30) positioned with respect to the connecting slot (60) of the housing (10) for attachment of the connecting box (1) to a surface of the solar panel (80); and
    a rear wall (19) of the housing (10) positioned at a distance (A) from the solar panel (80) when the connecting box (1) is in a fitted state relative to the solar panel (80) resulting in convectional cooling of the housing (10).

2. The connecting box (1) of claim 1, wherein the connecting slot (60) is fitted peripherally to the housing (10).

3. The connecting box (1) of claim 1, wherein the mounting cap (30) is formed from a plurality of parts.

4. The connecting box (1) of claim 1, wherein the mounting cap (30) surrounds the connecting slot.

5. The connecting box (1) of claim 1, wherein the mounting cap (30) includes at least one adhesive surface (32, 33) for holding an adhesive and/or a double-sided adhesive tape (34).

6. The connecting box (1) of claim 1, further comprising:
    air guide plates (23) which are arranged on the rear wall (19) of the housing.

7. The connecting box (1) of claim 6, wherein the air guide plates (23) are designed such that, in the fitted state, they are used to support the housing (10) with respect to the solar panel (80).

8. The connecting box (1) of claim 1, wherein, at least in places, the housing (10) rests closely on the printed circuit board (50) such that heat which is created is transported outwards through the housing (10).

9. The connecting box (1) of claim 8, wherein the printed circuit board (50) is a stamped grid.

10. The connecting box (1) of claim 1, wherein the housing (10) further comprises:
    a housing lower part (20) and a housing upper part (40) which closely surround the printed circuit board (50) and the at least one electronic component (51).

11. The connecting box (1) of claim 1, wherein the housing (10) is formed integrally by insert molding of the printed circuit board (50) and the at least one electronic component (51).

12. The connecting box (1) of claim 1, wherein the connecting slot (60) is suitable for holding an encapsulation medium.

\* \* \* \* \*